US008720168B2

(12) United States Patent
Kamigaito et al.

(10) Patent No.: US 8,720,168 B2
(45) Date of Patent: May 13, 2014

(54) FORM-FILL-SEAL MACHINE

(75) Inventors: Satoru Kamigaito, Omihachiman (JP); Masashi Kondo, Shiga (JP)

(73) Assignee: Ishida Co., Ltd., Kyoto (JP)

( * ) Notice: Subject to any disclaimer, the term of this patent is extended or adjusted under 35 U.S.C. 154(b) by 148 days.

(21) Appl. No.: 13/469,477

(22) Filed: May 11, 2012

(65) Prior Publication Data

US 2012/0285128 A1 Nov. 15, 2012

(30) Foreign Application Priority Data

May 11, 2011 (JP) ................................. 2011-106071

(51) Int. Cl.
*B65B 9/06* (2012.01)
(52) U.S. Cl.
USPC ................... 53/551; 53/450; 53/451; 53/550
(58) Field of Classification Search
USPC ............................ 53/450, 451, 550, 551, 545
See application file for complete search history.

(56) References Cited

U.S. PATENT DOCUMENTS

| | | | | | |
|---|---|---|---|---|---|
| 4,274,244 | A | * | 6/1981 | Gilbert | 53/451 |
| 4,288,965 | A | * | 9/1981 | James | 53/451 |
| 4,355,494 | A | * | 10/1982 | Tilman | 53/416 |
| 4,467,589 | A | * | 8/1984 | van Maanen | 53/450 |
| 4,501,109 | A | * | 2/1985 | Monsees | 53/451 |
| 4,534,818 | A | * | 8/1985 | Kreager et al. | 156/466 |
| 4,745,731 | A | * | 5/1988 | Talbott et al. | 53/451 |
| 4,759,170 | A | * | 7/1988 | Sawa et al. | 53/551 |
| 4,848,063 | A | * | 7/1989 | Niske | 53/451 |
| 5,067,311 | A | * | 11/1991 | Andersson | 53/551 |
| 5,085,036 | A | * | 2/1992 | Evans et al. | 53/550 |
| 5,177,935 | A | * | 1/1993 | Jones et al. | 53/433 |
| 5,313,766 | A | * | 5/1994 | Rimondi et al. | 53/451 |
| 5,417,035 | A | * | 5/1995 | English | 53/412 |
| 5,930,983 | A | * | 8/1999 | Terminella et al. | 53/436 |
| 6,574,944 | B2 | * | 6/2003 | Capodieci | 53/450 |
| 6,860,958 | B2 | * | 3/2005 | Swafford et al. | 156/251 |
| 8,061,020 | B2 | * | 11/2011 | Bussey et al. | 29/819 |
| 8,182,254 | B2 | * | 5/2012 | Sperry et al. | 425/112 |
| 8,225,583 | B2 | * | 7/2012 | Waldherr | 53/371.8 |
| 8,539,740 | B2 | * | 9/2013 | Tsuruta et al. | 53/451 |
| 2003/0093971 | A1 | * | 5/2003 | Terminella et al. | 53/133.4 |

FOREIGN PATENT DOCUMENTS

| | | |
|---|---|---|
| DE | 196 01 960 A1 | 7/1997 |
| DE | 20 2009 014336 U1 | 12/2010 |
| JP | 2009-280258 A | 12/2009 |

OTHER PUBLICATIONS

Extended European Search Report of the corresponding European Application No. 12167457.6, dated Sep. 12, 2012, 2013.

* cited by examiner

*Primary Examiner* — Christopher Harmon
(74) *Attorney, Agent, or Firm* — Global IP Counselors, LLP

(57) ABSTRACT

A form-fill-seal machine has a tube, a sailor-collar-shaped part, and a vertical sealing mechanism. The sailor-collar-shaped part wraps a sheet-shaped film around the tube so that two edges thereof define overlapping portions. The vertical sealing mechanism ultrasonically seals the overlapping portions of the sheet-shaped film in the vertical direction. The vertical sealing mechanism has an oscillator and a roller. The oscillator generates ultrasonic waves. The roller is disposed downstream of the oscillator along the advancing direction of the film. The roller holds down the film while rotating in the advancing direction of the film after the film has passed the oscillator.

13 Claims, 11 Drawing Sheets

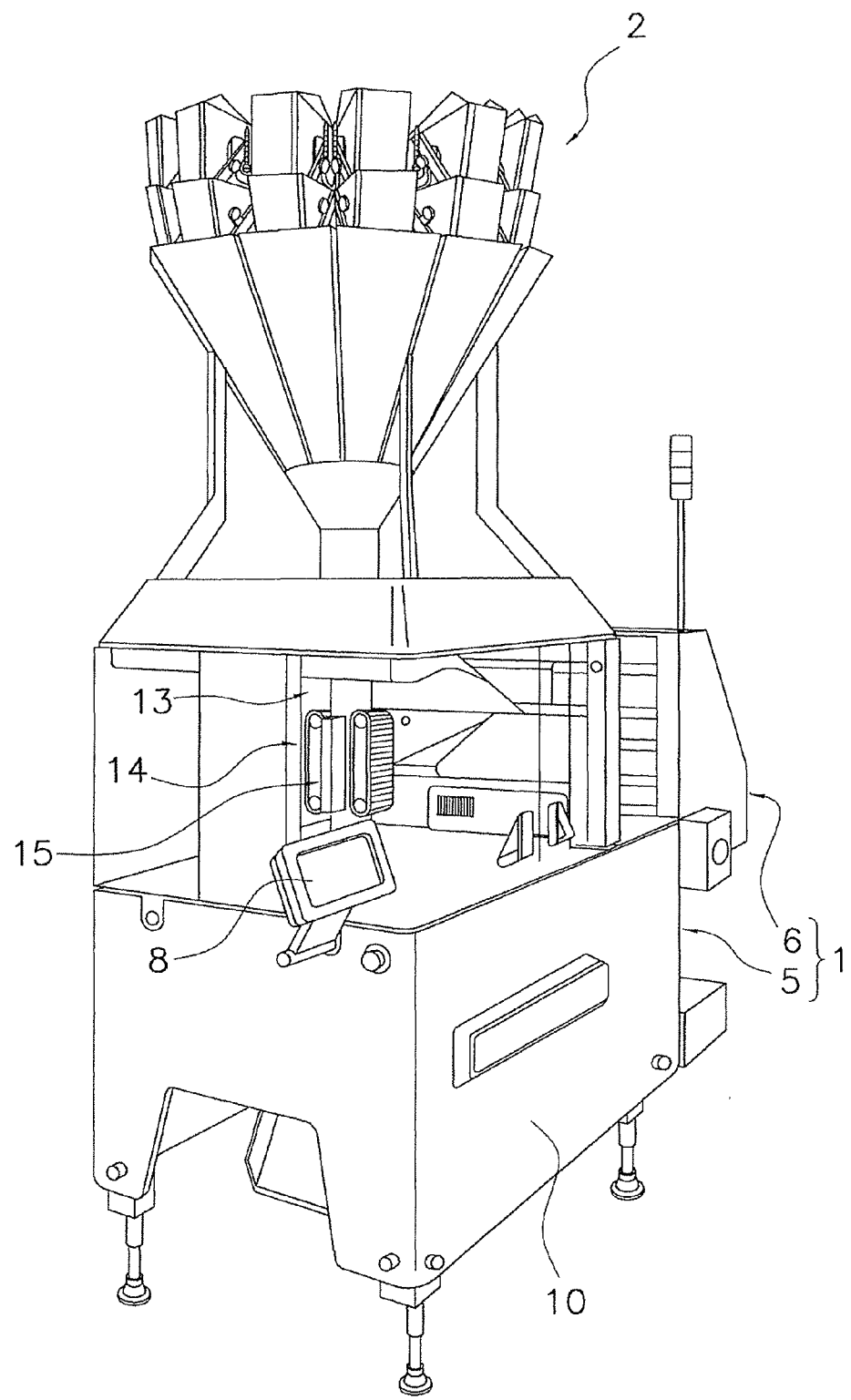
F I G. 1

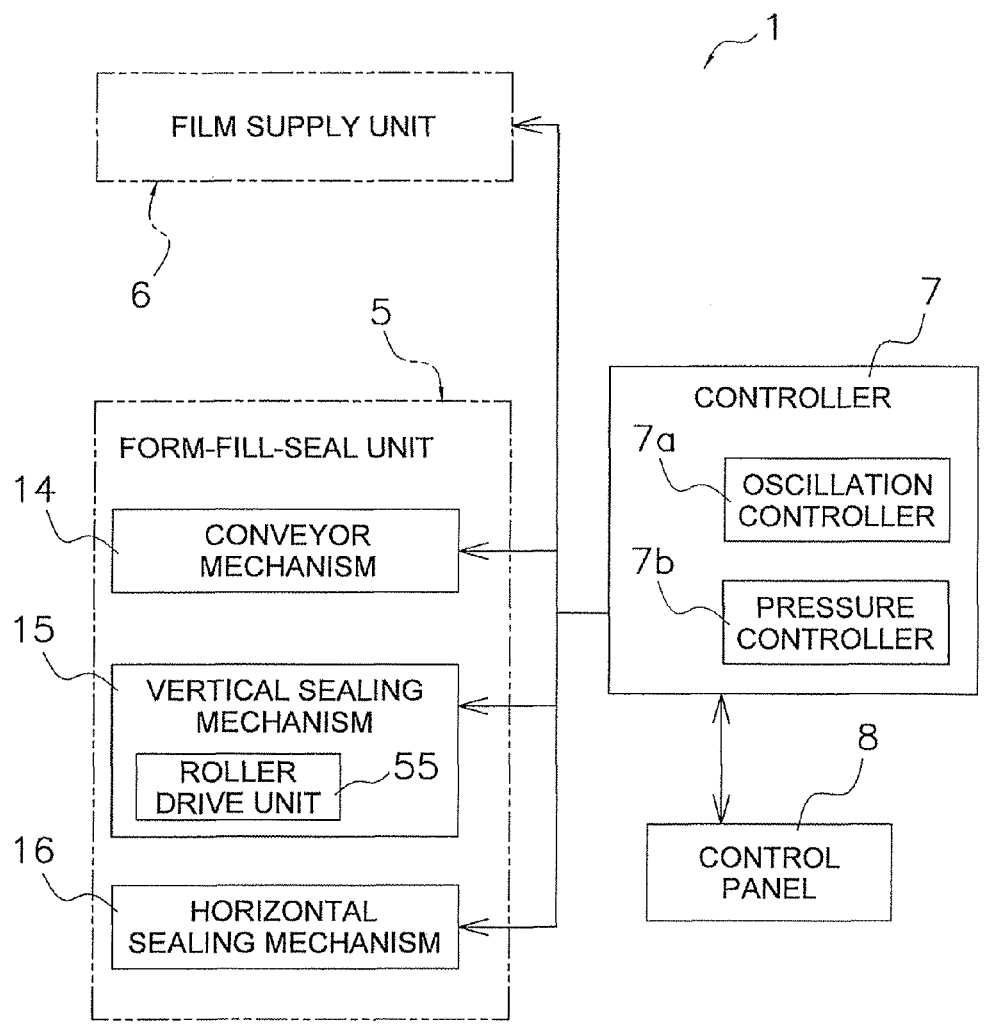
F I G. 4

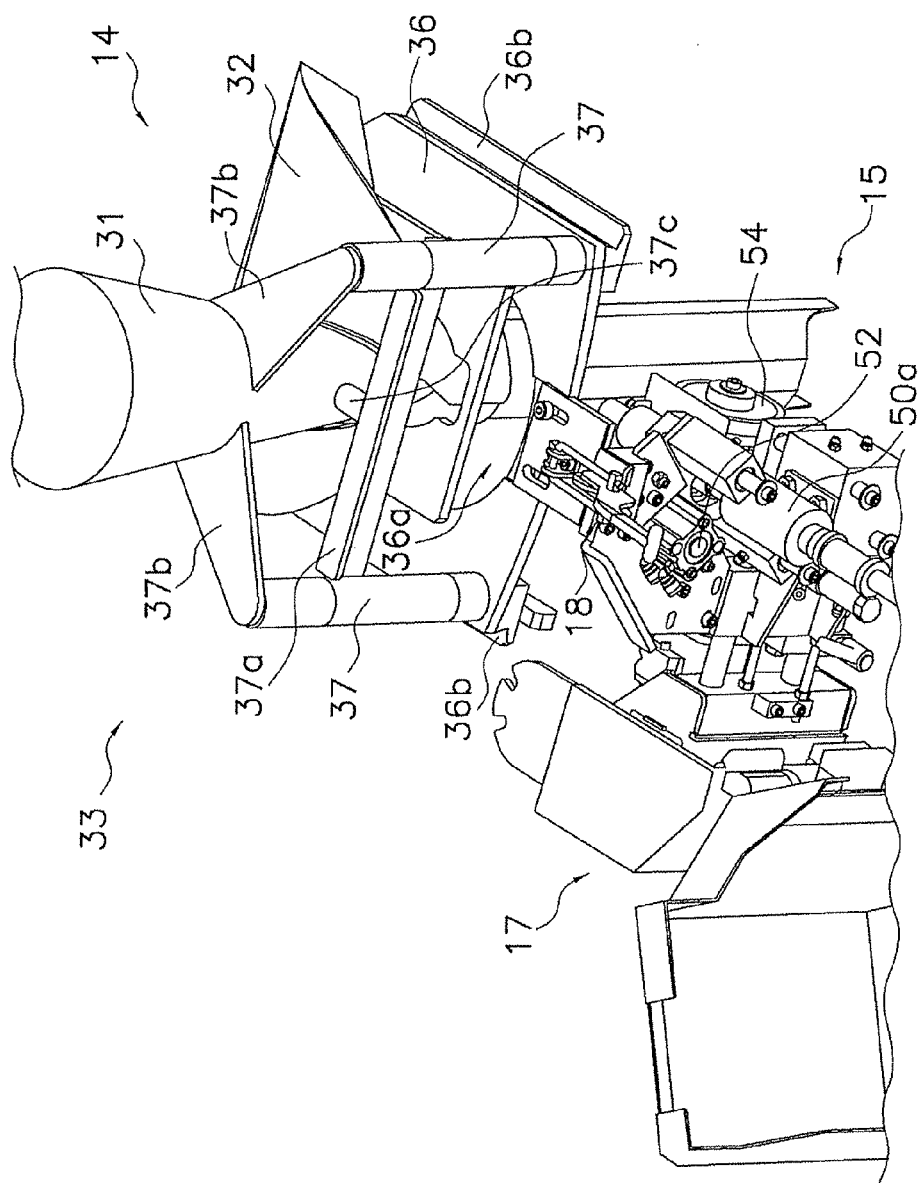
F I G. 6

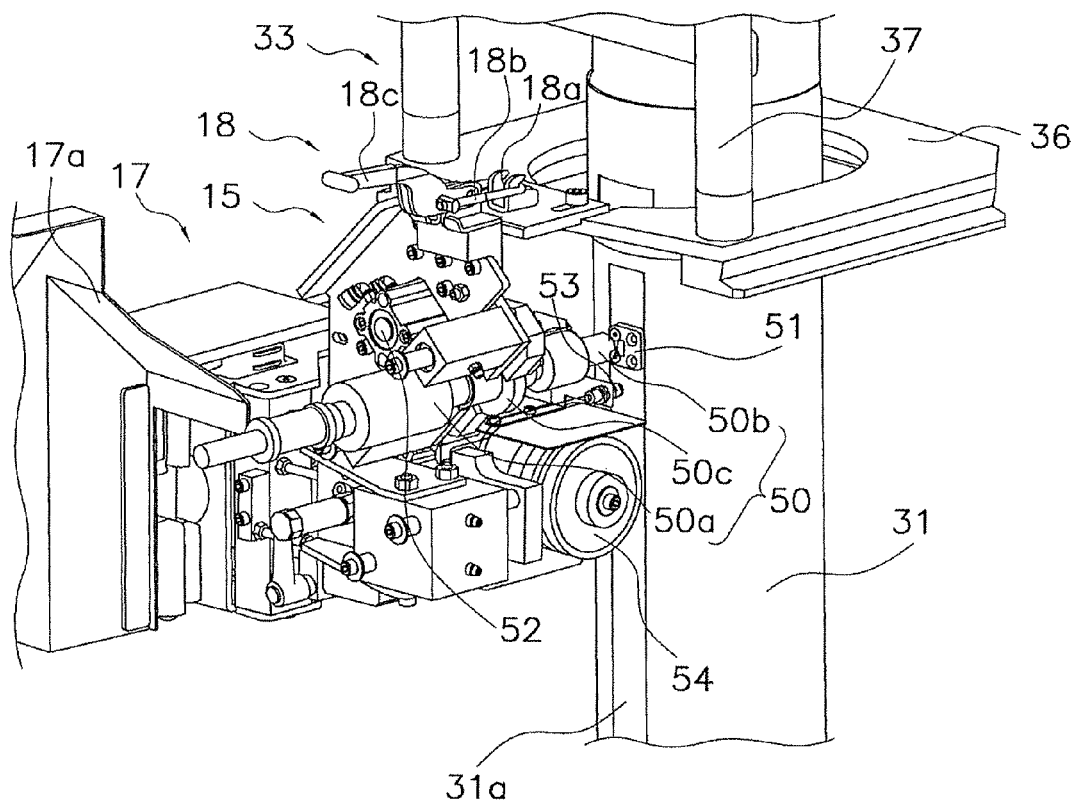
F I G. 8

FORM-FILL-SEAL MACHINE

TECHNICAL FIELD

The present invention relates to a form-fill-seal machine for creating an ultrasonic seal in a vertical direction at overlapping portions of a cylindrical packaging material.

BACKGROUND ART

Conventionally, there exists a form-fill-seal machine for creating an ultrasonic seal in a vertical direction at overlapping portions of a cylindrical packaging material (for example, Japanese Laid-open Patent Publication No. 2009-280258).

SUMMARY OF INVENTION

Technical Problem

When an external force of some sort is applied to the cylindrical packaging material before or after the ultrasonic seal is created, there is a risk of the overlapping portions in the vertical direction of the cylindrical packaging material opening horizontally. When the overlapping portions of the packaging material open, a suitable longitudinal seal is not formed. It is substantially conceivable that, in a form-fill-seal machine, an external force such as friction might be applied to a packaging material because the material is processed while being conveyed. In particular, the presence of an anvil that, together with an oscillator generating ultrasonic waves, sandwiches the overlapping portions of the packaging material can be a cause of the overlapping portions of the packaging material opening.

When a movable anvil is disposed on a cylindrical part, there is the possibility of various problems occurring inside the cylindrical part. Examples of such problems include lubricating oil applied to the anvil contacting the contents of the bag, ball bearings falling off into the bag, and contents getting caught on the anvil as the contents fall through the interior of the cylindrical part.

One object of the present invention is to provide a form-fill-seal machine capable of preventing the longitudinal overlapping portions of the cylindrical packaging material from opening horizontally.

Another object of the present invention is to provide a form-fill-seal machine capable of suppressing the occurrence of various problems within the interior of the cylindrical part.

Solution to Problem

A form-fill-seal machine according to a first aspect of the present invention has a cylindrical part, a sailor-collar-shaped part, and a longitudinal sealing unit. The sailor-collar-shaped part is configured to direct a sheet-shaped packaging material to wrap around the cylindrical part so that two edges thereof define overlapping portions. The longitudinal sealing unit ultrasonically seals the overlapping portions of the two ends of the sheet-shaped packaging material in a vertical direction. The longitudinal sealing unit has an oscillator and a roller. The oscillator generates ultrasonic waves. The roller is disposed downstream from the oscillator relative to the packaging material advancing direction. The roller rotates in the advancing direction of the packaging material and holds down the packaging material after the packaging material has passed the oscillator.

At this point, a longitudinal seal is created by ultrasonic sealing. A roller that holds down the packaging material while rotating in the packaging material advancing direction is disposed downstream of the oscillator along the packaging material advancing direction. It is thus possible to prevent the longitudinal overlapping portions of the cylindrical packaging material from opening horizontally. There can be conceived two modes in which the longitudinal overlapping portions of the cylindrical packaging material open horizontally: opening before being ultrasonically sealed and opening after being ultrasonically sealed.

A form-fill-seal machine according to a second aspect of the present invention is the form-fill-seal machine according to the first aspect, wherein the sailor-collar-shaped part has a folding-back section. The folding-back section changes the advancing direction of the packaging material to a substantially perpendicular downward direction. The cylindrical part extends in the substantially direction so that, after being folded back by the folding-back section, the packaging material is conveyed in the substantially downward direction until it reaches the roller.

At this time, the sheet-shaped packaging material is folded back in the substantially downward direction by the sailor-collar-shaped part and formed into a cylindrical shape. After being formed into a cylindrical shape, the packaging material is conveyed in the substantially downward direction and longitudinally sealed, and reaches the roller. As a result, the packaging material is subjected to pressure at the folding-back section of the sailor-collar-shaped part and at the roller. In other words, a substantially vertical pulling force is applied to the packaging material before and after the longitudinal seal is formed. It is therefore possible to prevent the longitudinal overlapping portions of the cylindrical packaging material from opening horizontally.

A form-fill-seal machine according to a third aspect of the present invention is the form-fill-seal machine according to the first aspect, wherein the cylindrical part has a flat surface extending in the packaging material advancing direction. The roller rotates in the packaging material advancing direction and holds or urges the packaging material against the flat surface after the material has passed the oscillator.

At this time, the roller holds the packaging material against the flat surface of the cylindrical part. It is therefore possible to hold down the packaging material after the longitudinal seal has been formed through a simple configuration.

A form-fill-seal machine according to a fourth aspect of the present invention is the form-fill-seal machine according to the first aspect, wherein an indentation is formed in an outer peripheral surface of the roller so that the area of contact between the ultrasonically sealed portion of the packaging material and the roller decreases.

When the packaging material is held down by the roller after being melted by the ultrasonic waves before hardening again, there is a risk of the packaging material stretching and the strength of the longitudinal seal weakening. An indentation is formed in the outer peripheral surface of the roller. As a result, the area of the portion of the longitudinal seal of the packaging material heated when the ultrasonic seal is formed that is held down by the outer peripheral surface of the roller is reduced. The strength of the longitudinal seal is therefore improved.

A form-fill-seal machine according to a fifth aspect of the present invention is the form-fill-seal machine according to the fourth aspect, wherein the indentation is formed around the entire periphery of the roller.

The indentation is formed around the entire periphery of the outer peripheral surface of the roller. As a result, the area of the portion of the longitudinal seal of the packaging material heated when the ultrasonic seal is formed that is held down by the outer peripheral surface of the roller is further reduced. The strength of the longitudinal seal is therefore further improved.

A form-fill-seal machine according to a sixth aspect of the present invention is the form-fill-seal machine according to the first aspect, further having a conveyor unit. The conveyor unit conveys the packaging material along the cylindrical part.

The cylindrical packaging material is smoothly conveyed.

A form-fill-seal machine according to a seventh aspect of the present invention is the form-fill-seal machine according to the sixth aspect, further having an oscillation controller. The oscillation controller changes the amplitude of the ultrasonic waves generated by the oscillator according to the speed at which the packaging material is conveyed by the conveyor unit.

When the conveying speed of the conveyor unit is slow, the packaging material passes the vicinity of the oscillator slowly and quickly when the conveying speed is fast. In other words, the conveying speed of the conveyor unit affects the strength of the longitudinal seal. The amplitude of the ultrasonic waves is controlled according to the conveying speed of the conveyor unit. The amplitude of the ultrasonic waves is a factor affecting the strength of the longitudinal seal. It is therefore possible to minimize variations in the strength of the longitudinal seal regardless of change in the conveying speed of the conveyor unit.

A form-fill-seal machine according to an eighth aspect of the present invention is the form-fill-seal machine according to the sixth aspect, further having a pressure applying unit and a pressure controller. The pressure applying unit pressurizes the oscillator against the packaging material. The pressure controller changes the pressure applied by the pressure applying unit according to the speed at which the packaging material is conveyed by the conveyor unit.

When the conveying speed of the conveyor unit is slow, the packaging material passes the vicinity of the oscillator slowly and quickly when the conveying speed is fast. In other words, the conveying speed of the conveyor unit affects the strength of the longitudinal seal. The pressure applied by the oscillator to the packaging material is controlled according to the conveying speed of the conveyor unit. The pressure applied by the oscillator to the packaging material is a factor affecting the strength of the longitudinal seal. It is therefore possible to control variations in the strength of the longitudinal seal regardless of changes in the conveying speed of the conveyor unit.

A form-fill-seal machine according to a ninth aspect of the present invention is the form-fill-seal machine according to the sixth aspect, wherein the longitudinal sealing unit further has a roller drive unit. The roller drive unit rotatably drives the roller so that the speed at which the packaging material is conveyed by the roller is greater than the speed at which the packaging material is conveyed by the conveyor unit.

The conveying speed of the roller is greater than the conveying speed of the conveyor unit. The roller is thus capable of easily applying a pulling force to the packaging material in the substantially perpendicular direction.

A form-fill-seal machine according to a tenth aspect of the present invention has a cylindrical part, a sailor-collar-shaped part, and a longitudinal sealing unit. The sailor-collar-shaped part wraps a sheet-shaped packaging material around the cylindrical part so that two edges thereof overlap. The longitudinal sealing unit ultrasonically seals the overlapping portions of the two ends of the sheet-shaped packaging material in the vertical direction. The longitudinal sealing unit has an oscillator and an immobile anvil. The oscillator generates ultrasonic waves. The anvil is disposed on the cylindrical part in a manner opposing the oscillator.

As described above, when a movable anvil is disposed on a cylindrical part, there is the possibility of various problems occurring inside the cylindrical part. At this point, a longitudinal seal is created by ultrasonic sealing. The anvil is disposed on the cylindrical part, but is immobile. It is therefore possible to suppress the occurrence of various problems within the interior of the cylindrical part.

A form-fill-seal machine according to an eleventh aspect of the present invention is the form-fill-seal machine according to the tenth aspect, wherein the anvil is disposed on the cylindrical part so as to project outward from an outer surface of the cylindrical part.

The anvil (except for the members for fixing the anvil in place on the cylindrical part) projects not inward, but outward with respect to the cylindrical part. It is therefore possible to further suppress the occurrence of various problems within the interior of the cylindrical part.

A form-fill-seal machine according to a twelfth aspect of the present invention is the form-fill-seal machine according to the tenth aspect, wherein the anvil is attachable and detachable with respect to the cylindrical part.

The anvil is detachable. It is therefore possible to change only the anvil and not the cylindrical part, even when the anvil is abraded.

A form-fill-seal machine according to a thirteenth aspect of the present invention is the form-fill-seal machine according to the tenth aspect, wherein the longitudinal sealing unit further has a roller. The roller is disposed downstream from the oscillator and the anvil along a direction of the packaging material advancing direction. The roller rotates in the packaging material advancing direction and holds down the packaging material after the material has passed the oscillator and the anvil.

When the contact resistance between the packaging material and the anvil increases, there is a greater risk of the longitudinal overlapping portions of the cylindrical packaging material opening horizontally. There can be conceived two modes in which the longitudinal overlapping portions of the cylindrical packaging material open horizontally: opening before being ultrasonically sealed and opening after being ultrasonically sealed. In order to reduce the contact resistance between the packaging material and the anvil, it is conceivable to make the anvil, for instance, a rotatable one that rotates in the packaging material advancing direction. However, as described above, such an anvil has the possibility of causing various problems within the interior of the cylindrical part. The anvil used here is immobile. A roller that holds down the packaging material while rotating in the advancing direction of the packaging material is disposed downstream of the oscillator and the anvil along the packaging material advancing direction. It is therefore possible to prevent the longitudinal overlapping portions of the cylindrical packaging material from opening horizontally while suppressing the occurrence of the problems described above within the interior of the cylindrical part.

Advantageous Effects of Invention

According to one aspect of the present invention, the longitudinal seal is formed through ultrasonic sealing. A roller that holds down the packaging material while rotating in the advancing direction of the packaging material is disposed downstream of the oscillator along the packaging material advancing direction. As a result, it is possible to prevent the longitudinal overlapping portions of the cylindrical packaging material from opening horizontally.

According to another aspect of the present invention, the longitudinal seal is formed through ultrasonic sealing. The anvil is disposed on the cylindrical part, but is immobile. It is therefore possible to suppress the occurrence of various problems within the interior of the cylindrical part.

BRIEF DESCRIPTION OF THE DRAWINGS

FIG. 1 is a perspective view of one embodiment of a form-fill-seal machine.

FIG. 4 is a block diagram of a control system for a form-fill-seal machine.

FIG. 6 is a perspective view of a form-fill-seal unit seen from a front right upper side.

FIG. 8 is a perspective view of a form-fill-seal unit seen from a front right side.

DESCRIPTION OF EMBODIMENTS

Figure 3:
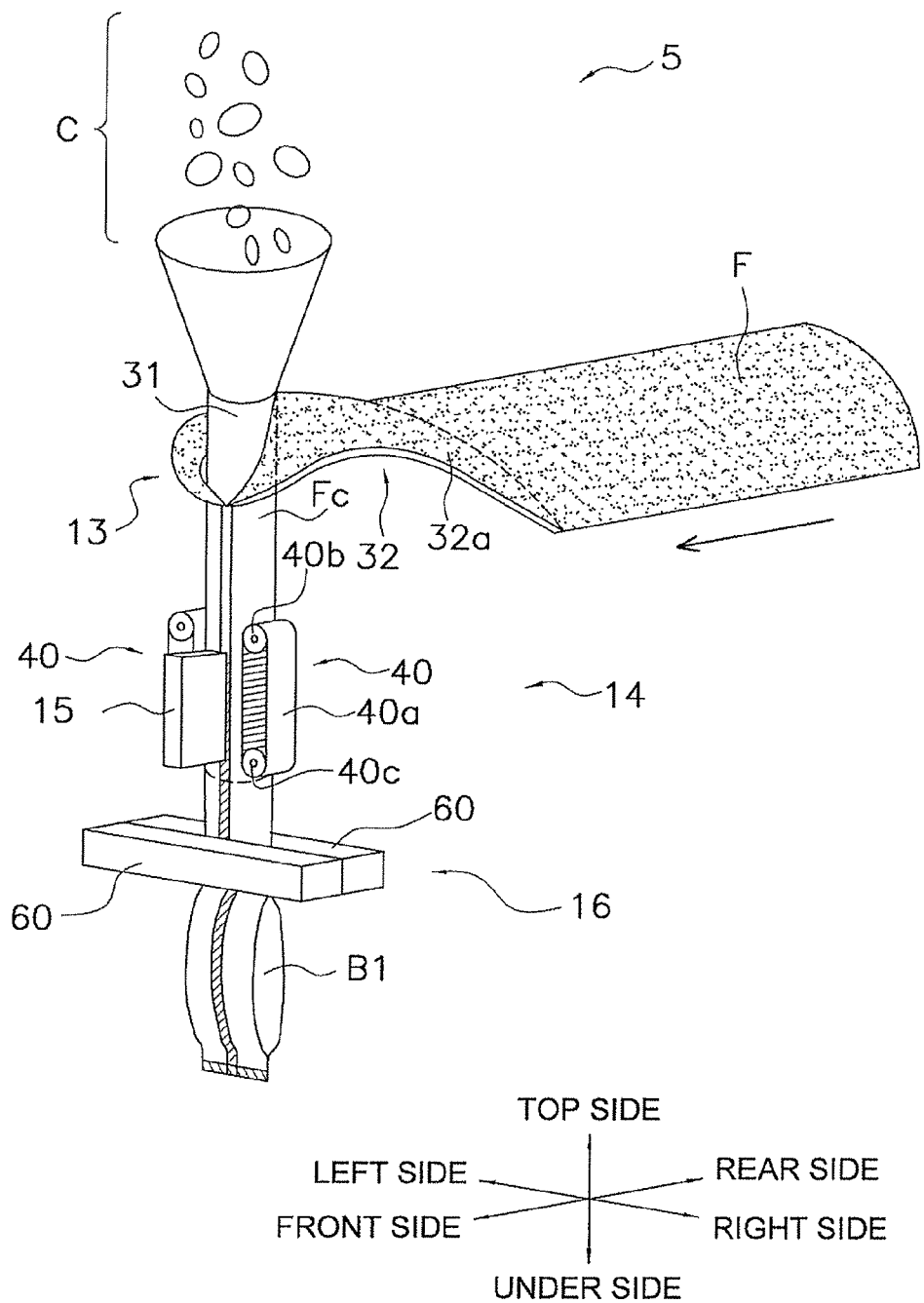
FIG. 3 is a perspective view of a form-fill-seal unit.

Hereafter follows a description of a form-fill-seal machine 1 according to one embodiment of the present invention with reference to the drawings. In describing the form-fill-seal machine 1, the terms "front (head-on)", "rear (back)", "up", "down", "left", and "right" shall be defined as shown in FIG. 3. "Upstream" and "downstream" shall be based on the direction in which a film F is conveyed.

(1) Overall Configuration

The form-fill-seal machine 1 is a machine for manufacturing a product comprising contents C, such as a snack food, sealed within a bag. As shown in FIGS. 1 through 4, the form-fill-seal machine 1 has a form-fill-seal unit 5 for bagging the contents C, a film supply unit 6 for supplying a film F forming the material for part of the product bag to the form-fill-seal unit 5, a controller 7 for controlling the overall operation of the form-fill-seal machine 1, and a body frame 10 for directly or indirectly supporting units 5, 6, and 7. The contents C bagged by the form-fill-seal unit 5 are weighed by a combination scale 2 disposed above the form-fill-seal unit 5. The form-fill-seal unit 5 bags the contents C in harmony with the timing at which the contents C are supplied from the combination scale 2.

An operation panel 8 is disposed on the front of the form-fill-seal unit 5 facing to the right. The operation panel 8 has an LCD and a touchscreen covering the LCD. The operation panel 8 displays information regarding the operating status of the form-fill-seal machine 1 to an operator, and accepts various settings inputted to the form-fill-seal machine 1.

Figure 5:
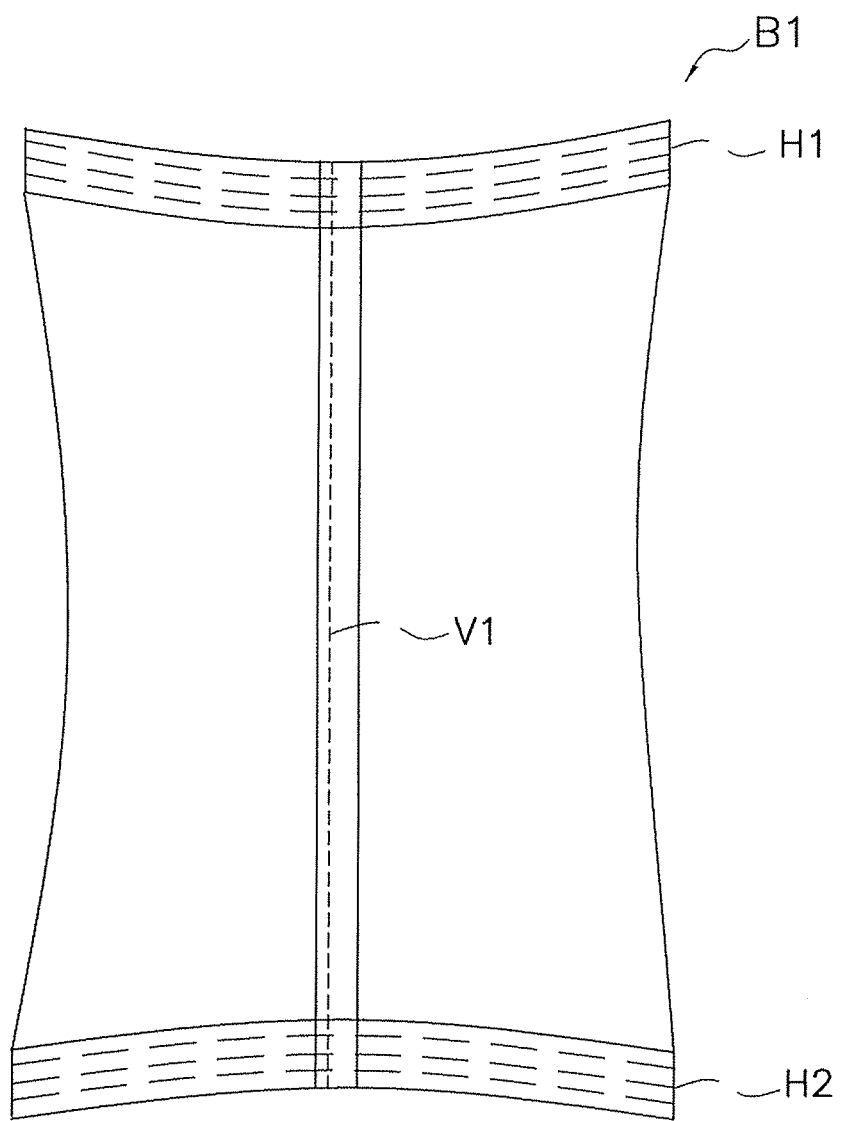
FIG. 5 is an external view of a pillow-shaped bag.

The form-fill-seal machine 1 manufactures a pillow-shaped bag B1 (hereafter, "pillow bag B1") as shown in FIG. 5. A vertical seal section V1 extending in the vertical direction and horizontal seal sections H1, H2 extending in the horizontal direction are formed on the pillow bag B1. The vertical seal section V1 and the horizontal seal sections H1, H2 are formed through ultrasonic sealing.

(2) Detailed Configuration (2-1) Film Supply Unit

Figure 2:
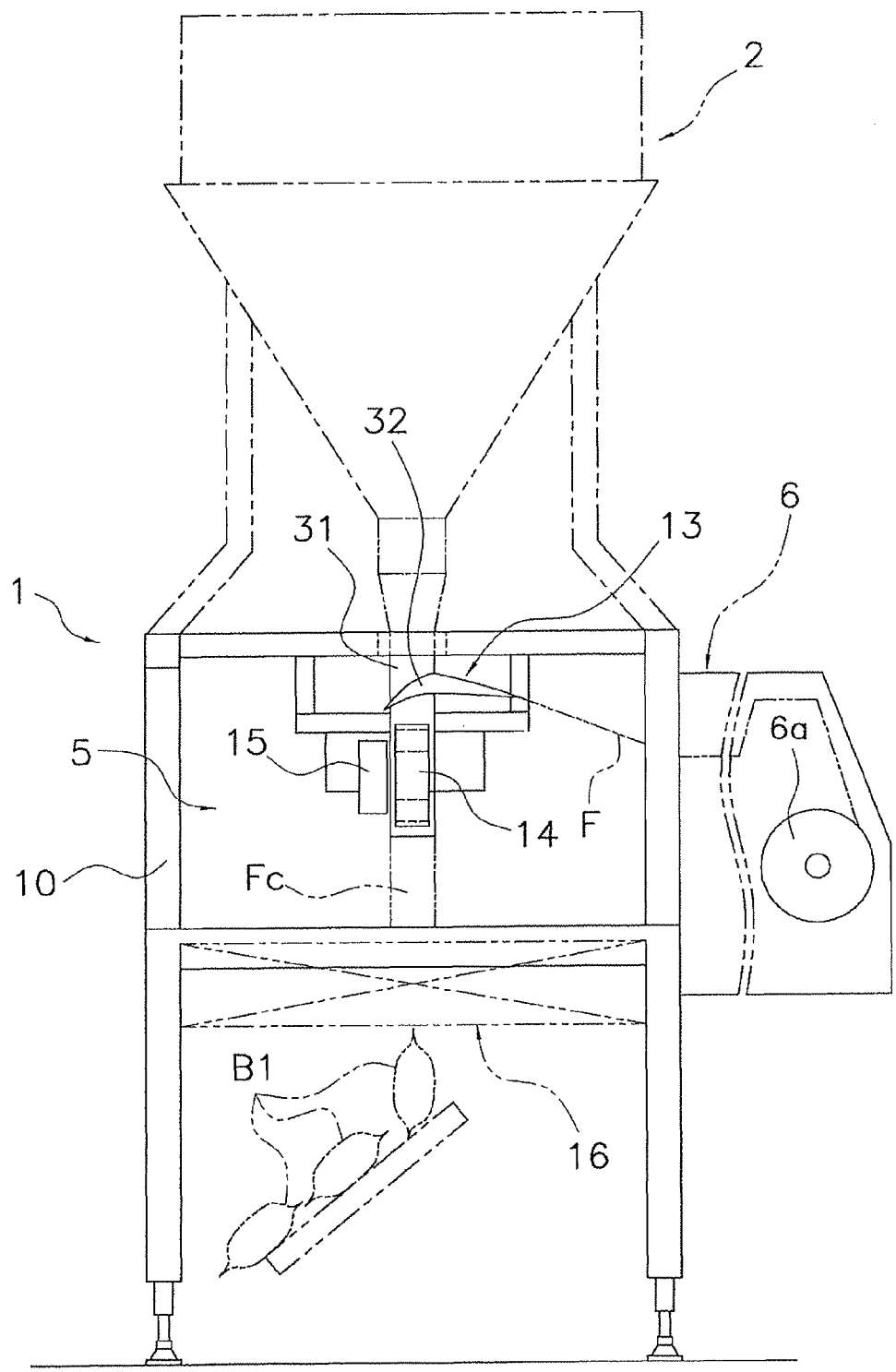
FIG. 2 is a right side view of a form-fill-seal machine.

The film supply unit 6 supplies a sheet-shaped film F that forms the material for the pillow bag B1 to the form-fill-seal unit 5. The film supply unit 6 has a film roll 6a around which the sheet-shaped film F is wrapped. The controller 7 reels out film F from the film roll 6a while synchronizing with the operation of the form-fill-seal unit 5. As shown in FIG. 2, the sheet-shaped film F is dispensed from the film roll 6a such that just prior to contacting the shaping mechanism 13, the sheet-shaped film F moves in an overall horizontal direction.

The rotational shaft of the film roll 6a is driven by a motor (not shown). Conveying force is applied to the film F by pulldown belt mechanisms 40, 40 described below. The drive speed of the film roll 6a and the pulldown belt mechanisms 40, 40 is controlled by the controller 7.

(2-2) Form-fill-seal unit

The form-fill-seal unit 5 has a shaping mechanism 13, a conveyor mechanism 14, a vertical sealing mechanism 15, a horizontal sealing mechanism 16, a hinge fixing mechanism 17, and a clamp fixing mechanism 18. The shaping mechanism 13 shapes the sheet-shaped film F conveyed from the film roll 6a into a cylindrical shape. The conveyor mechanism 14 conveys the film F downward after the film F is shaped into a cylindrical shape by the shaping mechanism 13 (the film F is hereafter referred to as cylindrical film Fc). The vertical sealing mechanism 15 ultrasonically seals the overlapping portions of the cylindrical film Fc in the vertical direction (longitudinal direction) and forms the vertical seal section V1. The overlapping portions of the cylindrical film Fc are the portions of the two ends of the sheet-shaped film Fc overlapping in the vertical direction. The horizontal sealing mechanism 16 ultrasonically seals predetermined portions of the cylindrical film Fc in the horizontal direction (left and right directions) and forms the horizontal seal sections H1, H2. The hinge fixing mechanism 17 fixes a primary part of the vertical sealing mechanism 15 to the body frame 10. The clamp fixing mechanism 18 fixes a primary part of the vertical sealing mechanism 15 and the shaping mechanism 13 in place.

(2-2-1) Shaping Mechanism

Figure 7:
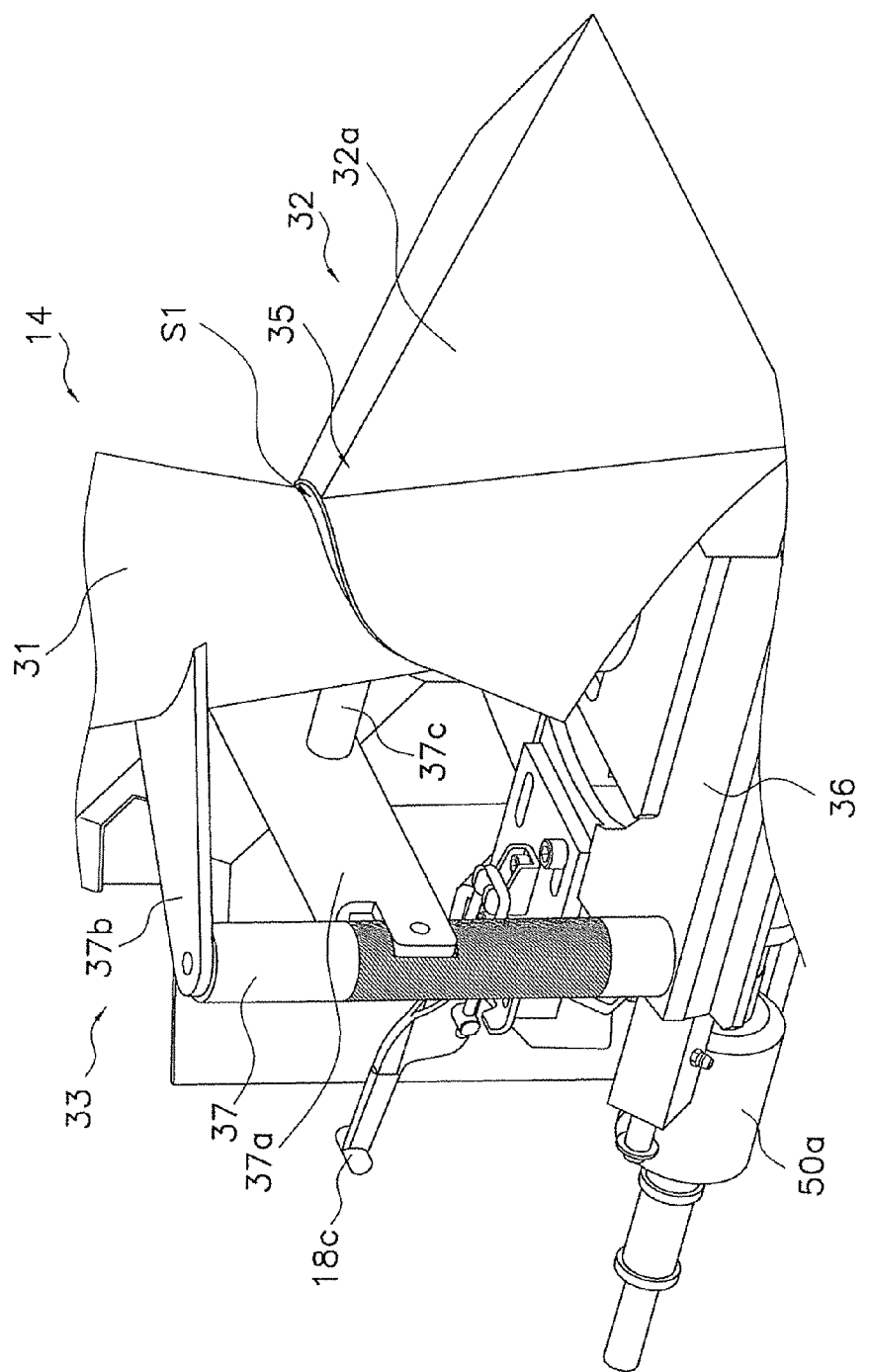
FIG. 7 is a perspective view of a form-fill-seal unit seen from a rear right side.

As shown in FIG. 6 and FIG. 7, the shaping mechanism 13 has a tube 31, a sailor-collar-shaped part 32, and a support frame 33. The support frame 33 directly supports the tube 31 and the sailor-collar-shaped part 32.

The tube 31 is a substantially cylindrical part extending in a substantially vertical direction, and a flat surface 31a is partially formed on a front side thereof (see FIG. 8). The flat surface 31a extends in a substantially perpendicular direction. The tube 31 has openings on upper and lower ends thereof. The upper part of the tube 31 has a funnel shape. As shown in FIG. 3, predetermined amounts of the contents C falling down from the combination scale 2 (see FIG. 1) fall into the upper opening end of the tube 31 into the interior of the tube 31, and fall through the interior of the tube 31. The combination scale 2 has a feeder, a pooling hopper, a weighing hopper, and a collecting/dispensing chute.

The sailor-collar-shaped part 32 is disposed so as to surround the tube 31. The sailor-collar-shaped part 32 guides the sheet-shaped film F so that the film F wraps around the tube 31. The sailor-collar-shaped part 32 has a sloped surface 32a.

The sheet-shaped film F reeled out from the film roll 6a is conveyed diagonally upward along the sloped surface 32a in contact with the sloped surface 32a.

As shown in FIG. 7, a narrow gap S1 is formed between the outer surface of the tube 31 and the sailor-collar-shaped part 32. The gap S1 is present along the entire periphery of the tube 31. After passing to the top of the sloped surface 32a, the film F enters the gap S1. While passing through the gap S1, the film F is wrapped around the outer surface of the tube 31. As a result, the shape of the film F is changed from that of a sheet to that of a cylinder. After the sheet-shaped film F is shaped into a cylindrical shape, the left edge and the right edge of the film F overlap thereby defining overlapping portions. Afterwards, the cylindrical film Fc is conveyed downward along the outer surface of the tube 31 so as to envelop the tube 31.

The section of the sailor-collar-shaped part 32 near the apex of the sloped surface 32a is referred to as a folding-back section 35. The folding-back section 35 is present along the entire periphery of the tube 31. After proceeding along the sloped surface 32a, the film F is abruptly folded back in a substantially perpendicular downward direction by the folding-back section 35. In other words, the folding-back section 35 abruptly changes the advancing direction of the film F to a substantially perpendicular downward direction near the apex of the sloped surface 32a. After being abruptly folded back by the folding-back section 35, the film F immediately enters the gap S1. The width of the gap S1 is narrow enough that the film F is firmly wrapped around the tube 31. Thus, the load (friction) applied to the film F near the folding-back section 35 is relatively great.

As shown in FIG. 6, the support frame 33 has a plate member 36, a pair of left and right handles 37, 37, a crossbar 37a, a pair of left and right crossbars 37b, 37b, and a crossbar 37c. The plate member 36, handles 37, 37 and crossbars 37a, 37b, 37b, and 37c are appropriately fixed, and the relative positions thereof to each other are defined.

The plate member 36 is a member that is substantially rectangular as viewed from overhead. In the center of the plate member 36 is formed an opening 36a that is substantially circular as viewed from overhead. The tube 31 is disposed so as to vertically penetrate the opening 36a. The handles 37, 37 are disposed so as to extend upward from the vicinities of the front left and right portions of the plate member 36. The crossbar 37a is laid across a substantially central gap between the handles 37, 37. The crossbars 37b, 37b are laid between upper ends of the handles 37, 37 and the tube 31. The crossbar 37c is laid between the center of the crossbar 37a and the tube 31. The tube 31 is fixed to the crossbars 37b, 37b, and 37c. The tube 31 is thereby fixed to the support frame 33.

While not shown in the drawing, the sailor-collar-shaped part 32 is also fixed to the support frame 33. The relative positions of the tube 31 and the sailor-collar-shaped part 32 are thereby fixed with the support frame 33 therebetween.

On the right and left of the plate member 36 are formed sliding rails 36b, 36b extending forward and backward. The sliding rails 36b, 36b support a shaft extending forward and backward and forming a part of the body frame 10 so as to be capable of sliding forward and backward. A user standing in front of the form-fill-seal machine 1 can exchange the entire shaping mechanism 13 by grasping the handles 37, 37 and sliding the shaft of the body frame 10 along the sliding rails 36b, 36b. The shapes and sizes of the tube 31 and the sailor-collar-shaped part 32 differ according to the shape and size of the bag being manufactured. The user can easily attach a shaping mechanism 13 corresponding to the bag being manufactured to the form-fill-seal machine 1.

(2-2-2) Conveyor Mechanism

The conveyor mechanism 14 has a pair of left and right pulldown belt mechanisms 40, 40. As shown in FIG. 3, the pulldown belt mechanisms 40, 40 are disposed symmetrically to the left and right of the tube 31. Each of the pulldown belt mechanisms 40, 40 extends in the vertical direction along the tube 31.

Each of the pulldown belt mechanisms 40, 40 has drive rollers 40b, 40b; driven rollers 40c, 40c; and belts 40a, 40a. The drive rollers 40b, 40b are driven by a motor (not shown). Each of the driven rollers 40c, 40c rotates in response to the rotation of the drive rollers 40b, 40b. The belts 40a, 40a exert suction upon the cylindrical film Fc. The pulldown belt mechanisms 40, 40 thereby convey the cylindrical film Fc downward along the outer surface of the tube 31 while exerting suction thereupon.

(2-2-3) Vertical Sealing Mechanism

As shown in FIG. 8, the vertical sealing mechanism 15 has an oscillator 50, an anvil 51, an air cylinder 52 for reciprocatingly moving the oscillator 50, an air jet 53, a roller 54, and a roller drive unit 55 for rotating the roller 54 (see FIG. 4).

The oscillator 50 has a piezoelectric element 50a, a horn 50b, and a booster 50c. The horn 50b and the piezoelectric element 50a are disposed in the stated order in a substantially horizontal direction from the rear surface toward the front surface. The air cylinder 52 is disposed immediately above the booster 50c and the piezoelectric element 50a. The piezoelectric element 50a is connected to a high frequency power source not shown in the drawing. The high frequency power source imparts a high frequency voltage to the piezoelectric element 50a, thereby generating ultrasonic waves. The horn 50b amplifies the ultrasonic waves generated by the piezoelectric element 50a. The booster 50c amplifies the ultrasonic waves generated by the piezoelectric element 50a, and also plays a role in supporting the oscillator 50 unit. The movement of the oscillator 50 is controlled by the controller 7 (more specifically, by an oscillation controller 7a described below).

Figure 9:
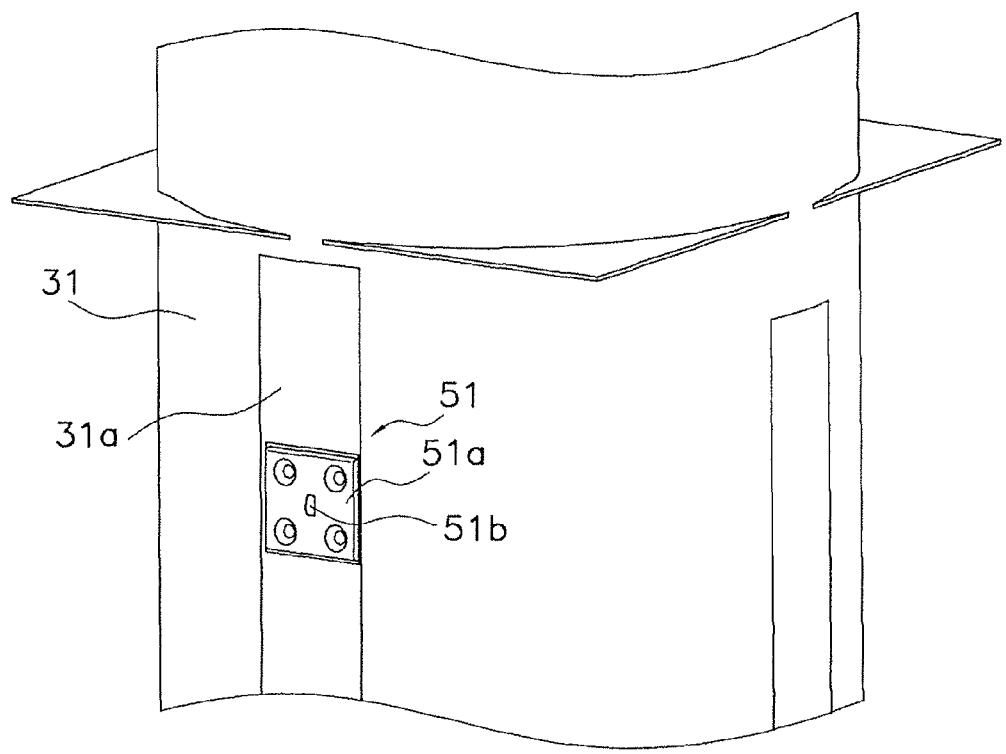
FIG. 9 is a perspective view of the periphery of an anvil seen from a front right side.

As shown in FIG. 9, the anvil 51 is fixed to the tube 31 so as to project to the front from the flat surface 31a of the tube 31. The anvil 51 is made of metal. The anvil 51 has a plate 51a that is substantially square as viewed from the front, and a protrusion 51b protruding to the front from the center of the plate 51a. The anvil 51 is immobile. The protrusion 51b is disposed facing the horn 50b. The overlapping portions of the cylindrical film Fc are sandwiched between the horn 50b and the anvil 51 and conveyed in a substantially perpendicular downward direction. While passing between the horn 50b and the anvil 51, the overlapping portions of the cylindrical film Fc are fused by the oscillation of the ultrasonic waves propagated from the horn 50b, and ultrasonically sealed in the vertical direction. A vertical seal section V1 is thereby formed in the center of the front surface of the cylindrical film Fc.

The anvil 51 is screwed onto the vicinity of the upper end of the flat surface 31a of the tube 31. The anvil 51 is attachable to and detachable from the tube 31. It is therefore possible to change only the anvil 51 and not the tube 31, even when the anvil 51 is abraded.

The air cylinder 52 reciprocatingly moves the oscillator 50 in a substantially horizontal direction with respect to the anvil 51. The air cylinder 52 thereby pressurizes the horn 50b against the overlapping portions of the cylindrical film Fc, and the anvil 51. The air cylinder 52 is controlled by the controller 7 (more specifically, by a pressure controller 7b described below).

The air jet 53 is disposed immediately underneath the oscillator 50; i.e., immediately downstream of the oscillator 50 and the anvil 51 in the advancing direction of the cylindrical film Fc. The air jet 53 fires air from an air jet hole. The air is fired toward the overlapping portions of the cylindrical film Fc immediately after the portions have passed the horn 50b and the anvil 51. The cooling and hardening of the overlapping portions of the cylindrical film Fc, which was heated and melted by the ultrasonic waves from the horn 50b, is thereby promoted. The amount of air fired from the air jet 53 and the timing thereof is controlled by the controller 7.

The roller 54 is disposed immediately underneath the air jet 53; i.e., immediately downstream of the air jet 53 in the advancing direction of the cylindrical film Fc. While rotating in the advancing direction of the cylindrical film Fc, the roller 54 holds down the overlapping portions of the cylindrical film Fc against the flat surface 31a of the tube 31. This operation of the roller 54 imparts a substantially downward-directed force to the cylindrical film Fc immediately after the film has passed the horn 50b, anvil 51, and air jet 53. Meanwhile, as described above, pressure caused by friction is applied to the film F in the vicinity of the folding-back section 35 of the sailor-collar-shaped part 32. After being folded back by the folding-back section 35, the film F is conveyed straight in the substantially perpendicular downward direction until it reaches the roller 54. The overlapping portions of the cylindrical film Fc are accordingly pulled substantially vertically before and after being ultrasonically sealed. This pulling force prevents the overlapping portions of the cylindrical film Fc extending in the vertical direction from opening horizontally before and after the ultrasonic seal is formed.

The rotation of the roller 54 in the advancing direction of the cylindrical film Fc prevents excessive friction from being applied to the overlapping portions of the cylindrical film Fc. The cylindrical film Fc is thereby smoothly conveyed without being damaged.

Figure 10:
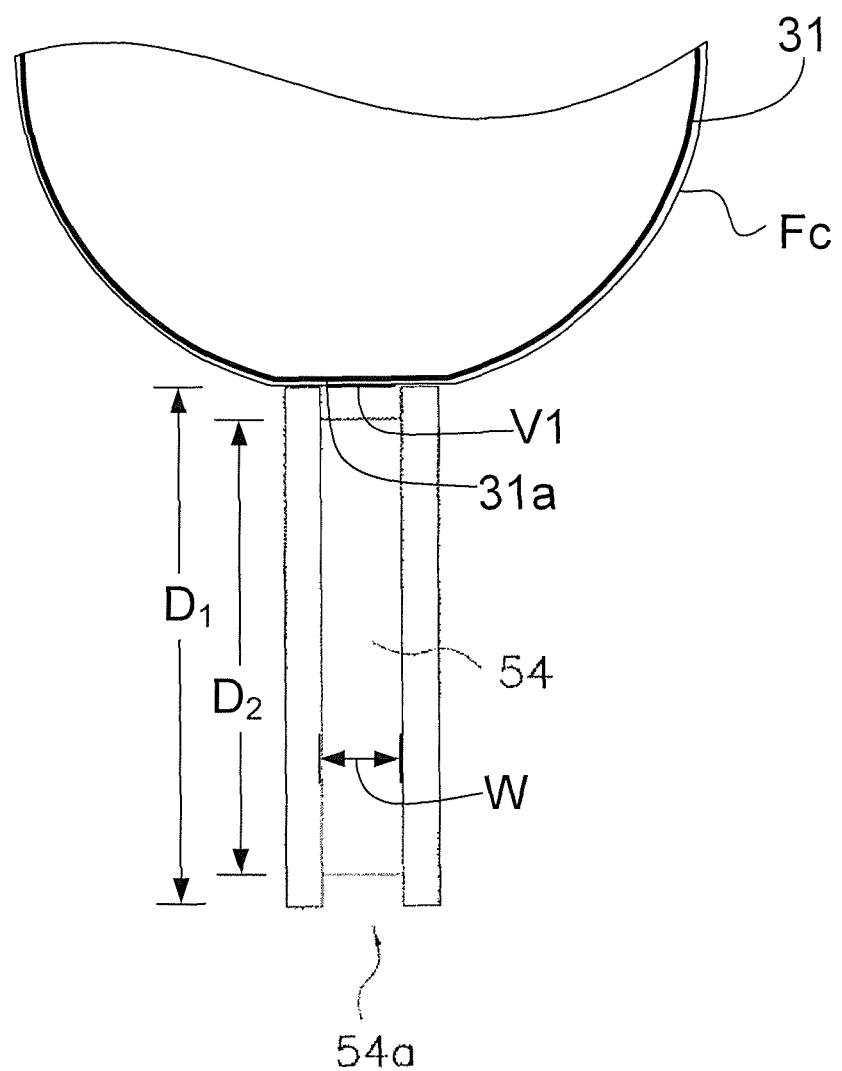
FIG. 10 is a front view of a roller.

As shown in FIG. 10, an indentation 54a is formed along the entire periphery of the roller 54 on the outer peripheral surface of the roller 54. Specifically, the roller 54 has an outer diameter $D_1$. The indentation 54a has an outer diameter $D_2$ that is smaller than $D_1$. The width W of the indentation 54a (width in the thickness direction of the roller 54) is approximately equal to the width in the horizontal direction of the overlapping portions of the cylindrical film Fc. The ultrasonically sealed portion of the overlapping portions of the cylindrical film Fc therefore recedes into the indentation 54a, and does not contact the outer peripheral surface of the roller 54. Thus, the longitudinally sealed portion of the cylindrical film Fc does not stretch and become deformed due to pressure from the roller 54 and the flat surface 31a of the tube 31 before sufficiently cooling and hardening. The strength of the longitudinal seal is thereby sufficiently maintained.

The roller drive unit 55 has a motor for rotatably driving the roller 54. The roller drive unit 55 is controlled by the controller 7. The roller drive unit 55 rotatably drives the roller 54 so that the speed at which the cylindrical film Fc is conveyed by the roller 54 is only slightly faster than the speed at which the cylindrical film Fc is conveyed by the conveyor mechanism 14. The cylindrical film Fc is therefore conveyed more quickly in the vicinity in which it contacts the roller 54 than at other positions. A pulling force in the vertical direction is therefore reliably applied to the overlapping portions of the cylindrical film Fc along the periphery of the roller 54. In other words, a situation in which the overlapping portions of the cylindrical film Fc open horizontally before or after being ultrasonically sealed is more reliably prevented.

(2-2-4) Horizontal Sealing Mechanism

As shown in FIG. 3, the horizontal sealing mechanism 16 has a pair of front and rear sealing jaws 60, 60 and a drive device (not shown) for driving the sealing jaws 60, 60. The sealing jaws 60, 60 are disposed symmetrically before and behind the cylindrical film Fc. Each of the sealing jaws 60, 60 extends in the left and right directions. Each of the sealing jaws 60, 60 has an oscillator and an anvil. Each of the oscillator and the anvil extends in the left and right directions.

The sealing jaws 60, 60 revolve in a D shape as seen from the left or the right synchronously with each other, and symmetrically draw near to and away from the front and rear of the cylindrical film Fc. The oscillator and anvil attached to one sealing jaw 60 are disposed approximately 180° apart with respect to the rotational center of the sealing jaw 60. When positioned closest to each other, the sealing jaws 60, 60 sandwich the cylindrical film Fc between the horn of the oscillator attached to one sealing jaw 60 and the anvil attached to the other sealing jaw 60. The portion of the cylindrical film Fc sandwiched between the horn and anvil of the sealing jaws 60, 60 is ultrasonically sealed in the left and right directions. One sandwiching operation simultaneously forms a horizontal seal section H1 on the upper part of a leading pillow bag B1 and a horizontal seal section H2 on the lower part of a pillow bag B1 manufactured thereafter. One sealing jaw 60 has an embedded cutter. The cutter cuts the cylindrical film Fc in the left and right directions while the cylindrical film Fc is sandwiched between the sealing jaws 60, 60. A pillow bag B1 is thereby cut off.

(2-2-5) Hinge Fixing Mechanism 17

The hinge fixing mechanism 17 fixes a longitudinal seal structure to the body frame 10. The longitudinal seal structure is a structure comprising the primary part of the vertical sealing mechanism 15. More specifically, the longitudinal seal structure is formed by those constituent elements of the vertical sealing mechanism 15 other than the anvil 51. The longitudinal seal structure is constituted by the constituent elements thereof being appropriately fixed.

The hinge fixing mechanism 17 is formed from a frame case 17a and a variety of hinges. The frame case 17a is fixed to the body frame 10. The frame case 17a partially accommodates the longitudinal seal structure. The longitudinal seal structure is fixed by screws or the like to the frame case 17a. The longitudinal seal structure is freely attachable and detachable as a whole with respect to the frame case 17a. The hinges are disposed on a bendable portion of the frame case 17a. The opening and closing of the hinges causes the frame case 17a to bend in a horizontal direction at the bendable portion. When the frame case 17a is bent at the bendable portion, the longitudinal seal structure moves with respect to the tube 31 without the height thereof changing. By adjusting the degree to which the hinges are opened or closed, a user can adjust the relative positions of the horn 50b of the oscillator 50 included in the longitudinal seal structure and the anvil 51 fixed to the tube 31. Though not shown in the drawing, the hinge fixing mechanism 17 has a fixture for maintaining the degree to which the hinges are opened or closed after being adjusted.

(2-2-6) Clamp Fixing Mechanism 18

The clamp fixing mechanism 18 fixes a forming structure and the longitudinal seal structure. The forming structure is a structure formed from the shaping mechanism 13 and the anvil 51. The forming structure is constituted by the constituent elements thereof being appropriately fixed. The forming structure is attachable and detachable as a whole with respect to the body frame 10. Such attachment and detachment is performed by sliding the shaft forming a part of the body frame 10 along the sliding rails 36b, 36b forming a part of the forming structure.

The clamp fixing mechanism 18 has a claw-shaped hook 18a, a round hook 18b, and a lever 18c. As shown in FIG. 8, the claw-shaped hook 18a is fixed to the center of the front surface of the plate member 36 of the support frame 33 included in the forming structure. The round hook 18b is fixed to the longitudinal seal structure. When the lever 18c is tightened with the round hook 18b hooked on the claw-shaped hook 18a, the relative positions of the forming structure and the longitudinal seal structure are fixed. In other words, by using the clamp fixing mechanism 18, it is possible to fix the relative positions of the horn 50b of the oscillator 50 included in the longitudinal seal structure and the anvil 51 fixed to the tube 31.

The clamp fixing mechanism 18 fixes the relative positions of the forming structure fixed by the hinge fixing mechanism 17 and the longitudinal seal structure so as to reinforce the same. The hinge fixing mechanism 17 fixes the relative positions of the forming structure and the longitudinal seal structure primarily so as not to change in the horizontal direction. The clamp fixing mechanism 18 fixes the relative positions of the forming structure and the longitudinal seal structure primarily so as not to change in the vertical direction. The relative positions of the horn 50b of the oscillator 50 and the anvil 51 are therefore appropriately maintained by the hinge fixing mechanism 17 and the clamp fixing mechanism 18.

When the forming structure and the longitudinal seal structure are fixed in place by the hinge fixing mechanism 17 and the clamp fixing mechanism 18, the air cylinder 52 moves the oscillator 50 in a direction from the horn 50b substantially toward the anvil 51 and applies pressure to the cylindrical film Fc. In other words, the longitudinal seal structure permits the oscillator 50 to move in a direction from the horn 50b substantially toward the anvil 51. Meanwhile, when the forming structure and the longitudinal seal structure are fixed in place by the hinge fixing mechanism 17 and the clamp fixing mechanism 18, the oscillator 50 is fixed with respect to directions other than the direction from the horn 50b substantially toward the anvil 51. In other words, the longitudinal seal structure supports the oscillator 50 so that the oscillator 50 cannot move in a direction other than from the horn 50b substantially toward the anvil 51.

(3) Controller

The controller 7 has a CPU, ROM, RAM, and flash memory. The controller 7 controls the operation of the various parts of the form-fill-seal machine 1 by loading and executing a program stored in the flash memory. As shown in FIG. 4, the controller 7 functions as an oscillation controller 7a and a pressure controller 7b. The controller 7 is connected to the film supply unit 6, the conveyor mechanism 14, the vertical sealing mechanism 15, the horizontal sealing mechanism 16, and the operation panel 8. The controller 7 is also connected to the combination scale 2.

The oscillation controller 7a controls the high frequency power source, thereby controlling the attributes of the ultrasonic waves generated by the oscillator 50 (including number of oscillations, amplitude, and ultrasonic waves generation timing). The oscillation controller 7a changes the amplitude of the ultrasonic waves according to the speed at which the cylindrical film Fc is conveyed by the conveyor mechanism 14. More specifically, the oscillation controller 7a increases the amplitude of the ultrasonic waves the faster the speed at which the cylindrical film Fc is conveyed by the conveyor mechanism 14.

The pressure controller 7b controls the air cylinder 52, thereby changing the pressure applied by the horn 50b to the cylindrical film Fc and the anvil 51, according to the speed at which the cylindrical film Fc is conveyed by the conveyor mechanism 14. More specifically, the pressure controller 7b increases the pressure applied by the horn 50b to the cylindrical film Fc and the anvil 51 the faster the speed at which the cylindrical film Fc is conveyed by the conveyor mechanism 14.

When the conveying speed of the conveyor mechanism 14 is low, the cylindrical film Fc passes the vicinity of the oscillator 50 slowly, and quickly when the conveying speed is high. In other words, the conveying speed of the conveyor mechanism 14 affects the strength of the longitudinal seal. In this embodiment, the amplitude of the ultrasonic waves is controlled according to the conveying speed of the conveyor mechanism 14. The amplitude of the ultrasonic waves is a factor affecting the strength of the longitudinal seal. In this embodiment, the pressure applied by the horn 50b to the cylindrical film Fc and the anvil 51 is controlled according to the conveying speed of the conveyor mechanism 14. It is therefore possible to control variations in the strength of the longitudinal seal regardless of changes in the conveying speed of the conveyor mechanism 14.

(4) Operation of the Form-Fill-Seal Machine

When the conveyor mechanism 14 and film roll 6a are driven, the sheet-shaped film F is reeled off of the film roll 6a. After being reeled off of the film roll 6a, the sheet-shaped film F arrives at the shaping mechanism 13. The shaping mechanism 13 shapes the sheet-shaped film F into a cylindrical film Fc. At this point, the left and right edges of the sheet-shaped film F overlap in the vertical direction.

Next, the cylindrical film Fc having the vertically overlapping portions descends along the tube 31 toward the vertical sealing mechanism 15. The vertical sealing mechanism 15 ultrasonically seals the portions of the cylindrical film Fc overlapping in the vertical direction, thereby forming the vertical seal section V1.

Next, the cylindrical film Fc having the vertical seal section V1 descends out of the tube 31 toward the horizontal sealing mechanism 16. At a timing coinciding therewith, contents C drop from the combination scale 2 through the interior of the tube 31 toward the interior of the cylindrical film Fc. The controller 7 commands a controller (not shown) of the combination scale 2 to drop the contents C at an appropriate timing. The horizontal sealing mechanism 16 ultrasonically seals the cylindrical film Fc in the left and right directions at a predetermined position with the cylindrical film Fc filled with the contents C. At the same time, the horizontal sealing mechanism 16 cuts the periphery of the ultrasonically sealed portion of the cylindrical film Fc in the left and right directions. A pillow bag B1 is thereby cut off from the cylindrical film Fc.

(5) Characteristics (5-1)

In the above embodiment, a longitudinal seal is created by ultrasonic sealing. The roller 54 for holding down the film F while rotating in the advancing direction of the film F is disposed downstream of the oscillator 50 along the advancing direction of the film F. It is thus possible to prevent the longitudinal overlapping portions of the cylindrical film Fc from opening horizontally. There can be conceived two modes in which the longitudinal overlapping portions of the cylindrical film Fc open horizontally: opening before being ultrasonically sealed and opening after being ultrasonically sealed (5-2)

In the above embodiment, the sheet-shaped film F is folded back in the substantially perpendicular downward direction at the sailor-collar-shaped part 32 and formed into a cylindrical shape. The cylindrical film Fc is conveyed in the substantially perpendicular downward direction and longitudinally sealed, and thereafter reaches the roller 54. The film F is thereby subjected to pressure from the folding-back section 35 of the sailor-collar-shaped part 32 and the roller 54. In other words, a substantially vertical pulling force is applied to the film F before and after the longitudinal seal is formed. It is thus possible to prevent the longitudinal overlapping portions of the cylindrical film Fc from opening horizontally.

(5-3)

When the film F is held down by the roller 54 after being melted by the ultrasonic waves before hardening again, there is a risk of the film F stretching and the strength of the longitudinal seal weakening. In the above embodiment, the indentation 54a is formed along the entire periphery of the roller 54 on the outer peripheral surface thereof. As a result, the area of the portion of the longitudinal seal of the film F heated when the ultrasonic seal is formed that is held down by the outer peripheral surface of the roller 54 is reduced. The strength of the longitudinal seal is therefore improved.

(5-4)

In the above embodiment, the anvil 51 is disposed on the tube 31, but is immobile. The anvil 51 also projects not to the inside but to the outside of the tube 31. It is therefore possible to minimize the occurrence of various problems within the interior of the tube 31.

(5-5)

When the contact resistance between the film F and the anvil 51 increases, the risk of the longitudinal overlapping portions of the cylindrical film Fc opening horizontally increases. In order to reduce the contact resistance between the film F and the anvil 51, it is conceivable to make the anvil 51, for instance, a rotatable one that rotates in the advancing direction of the film F. However, such an anvil 51 has the possibility of causing various problems within the interior of the tube 31. In the above embodiment, the anvil 51 is immobile. The roller 54 for holding down the film F while rotating in the advancing direction of the film F is disposed downstream of the oscillator 50 and the anvil 51 along the advancing direction of the film F. It is therefore possible to prevent the longitudinal overlapping portions of the cylindrical film F from opening horizontally while inhibiting various problems from occurring within the interior of the cylindrical part.

(6) Modifications

An embodiment of the present invention was described above, but the present invention is not limited to this embodiment; various modifications within the scope of the invention are possible. For instance, modifications such as the followings are possible.

(6-1)

In the embodiment above, an example of manufacturing a pillow bag B1 is described, but the present invention can also be applied to other types of bags, for instance, such as square-shaped bags, flat-bottomed bags, hem seal bags, or the like.

(6-2)

In the embodiment above, the indentation 54a is formed around the entire periphery of the roller 54. However, the indentation 54a may also be formed discontinuously in the peripheral direction of the roller 54. In this case as well, the area of contact between the ultrasonically sealed portion of the cylindrical film Fc and the roller 54 is small, reducing the possibility of damage to the ultrasonic seal.

Alternatively, no indentation 54a need be formed. In particular, the indentation is unnecessary when the cylindrical film Fc can be sufficiently cooled by the air jet 53 or the like immediately after the ultrasonic sealing is performed.

(6-3)

In the embodiment above, the roller 54 is rotatably driven by the roller drive unit 55. However, the roller drive unit 55 may be omitted, and the roller 54 made a non-driven type. In this case as well, the amount of friction applied to the cylindrical film Fc by the rotation of the roller 54 is reduced. The roller 54 is pulled by the conveyed cylindrical film Fc, and rotates.

(6-4)

The anvil 51 may be driven. For example, the protrusion 51b of the anvil 51 may be changed to a roller that rotates in the advancing direction of the cylindrical film Fc.

(6-5)

Figure 11A:
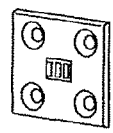
FIG. 11(a) is an illustration of an example of a modification of an anvil.
Figure 11B:
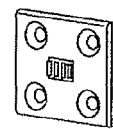
FIG. 11(b) is another illustration of an example of a modification of an anvil.
Figure 11C:
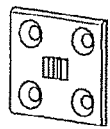
FIG. 11(c) is another illustration of an example of a modification of an anvil.
Figure 11D:
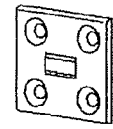
FIG. 11(d) is another illustration of an example of a modification of an anvil.

The shape of the anvil 51 is not limited to that given above. For example, as shown in FIGS. 11(a) and 11(b), a shape wherein a plurality of protrusions are present is also acceptable. Alternatively, as shown in FIG. 11(c), a wavy shape is also acceptable. Alternatively, as shown in FIG. 11(d), a shape wherein a plurality of gently projecting protrusions are present is also acceptable.

(6-6)

A roller similar to the roller 54 may be disposed directly above the oscillator 50.

(6-7)

The platform against which the cylindrical film Fc is sandwiched by the roller 54 need not be the flat surface 31a of the tube 31, nor the tube 31 itself. For example, a metal plate or the like may be fixed to the front side of the tube 31.

The invention claimed is:

1. A form-fill-seal machine comprising:
   a cylindrical part;
   a wrapping part configured to direct a sheet-shaped packaging material to wrap around the cylindrical part so that edges of the sheet-shaped packaging material overlap one another defining overlapping portions; and
   a conveyor unit for conveying the packaging material along the cylindrical part;
   a sealing unit for ultrasonically sealing the overlapping portions in a packaging material advancing direction; and
   a roller adapted to rotate with the packaging material moving in the packaging material advancing direction, the roller being disposed downstream of the sealing unit in a packaging material advancing direction to urge the packaging material against the cylindrical part immediately after the packaging material has passed the sealing unit while the roller rotates,
   wherein the roller is driven so that a roller speed at which the packaging material is conveyed by the roller is greater than a conveyor speed at which the packaging material is conveyed by the conveyor unit.

2. The form-fill-seal machine according to claim 1, wherein:
   the roller rotates while holding down both sides of portions sealed by the sealing unit against the cylindrical part.

3. The form-fill-seal machine according to claim 1, wherein:
   the cylindrical part has a flat surface extending in the advancing direction of the packaging material; and
   the roller holds down the packaging material against the flat surface after the packaging material has passed the oscillator while the roller rotates in the packaging material advancing direction.

4. The form-fill-seal machine according to claim 1, wherein:
   an outer peripheral surface of the roller having an indentation such that an area of contact between an ultrasonically sealed part of the packaging material and the roller is reduced, the indentation being formed around the entire periphery of the roller.

5. The form-fill-seal machine according to claim 1, further comprising:

an oscillation controller for changing the amplitude of the ultrasonic waves generated by the oscillator according to the speed at which the packaging material is conveyed by the conveyor unit.

6. The form-fill-seal machine according to claim 1, further comprising:
a pressure applying unit for pressurizing the oscillator against the packaging material; and
a pressure controller for changing the pressure applied by the pressure applying unit according to the speed at which the packaging material is conveyed by the conveyor unit.

7. The form-fill-seal machine according to claim 2, wherein:
the cylindrical part has a flat surface extending in the advancing direction of the packaging material; and
the roller holds down the packaging material against the flat surface after the packaging material has passed the oscillator while the roller rotates in the packaging material advancing direction.

8. The form-fill-seal machine according to claim 7, wherein:
an outer peripheral surface of the roller having an indentation such that an area of contact between an ultrasonically sealed part of the packaging material and the roller is reduced, the indentation being formed around the entire periphery of the roller.

9. The form-fill-seal machine according to claim 1, wherein the roller is disposed downstream of the oscillator relative to the packaging material advancing direction.

10. The form-fill-seal machine according to claim 1, wherein:
the sealing means further includes an immobile anvil disposed on the cylindrical part so as to face the oscillator.

11. The form-fill-seal machine according to claim 10, wherein:
the anvil is attachable and detachable with respect to the cylindrical part.

12. The form-fill-seal machine according to claim 10, wherein:
the anvil is disposed on the cylindrical part so as to project outward from an outer surface of the cylindrical pan.

13. The form-fill-seal machine according to claim 10, wherein the
sealing means further comprises a roller disposed downstream of the oscillator and the anvil in a packaging material advancing direction, the roller holding down the packaging material after the material has passed the oscillator and the anvil, while the roller rotates with the packaging material moving in the packaging material advancing direction.

* * * * *